United States Patent [19]

Brunken

[11] Patent Number: 4,732,249
[45] Date of Patent: Mar. 22, 1988

[54] FLUID FRICTION CLUTCH

[75] Inventor: Gerd Brunken, Dittelbrunn, Fed. Rep. of Germany

[73] Assignee: Fichtel & Sachs AG

[21] Appl. No.: 887,322

[22] Filed: Jul. 21, 1986

[30] Foreign Application Priority Data

Jul. 23, 1985 [DE] Fed. Rep. of Germany ....... 3526287

[51] Int. Cl.$^4$ .............................................. F16D 35/00
[52] U.S. Cl. .................. 192/58 B; 192/82 T
[58] Field of Search .................. 192/58 A, 58 B, 82 T

[56] References Cited

U.S. PATENT DOCUMENTS

| | | | |
|---|---|---|---|
| 2,863,542 | 12/1958 | Kelsey | 192/58 B |
| 4,190,139 | 2/1980 | Tinholt et al. | 192/82 T |

FOREIGN PATENT DOCUMENTS

| | | |
|---|---|---|
| 0105646 | 4/1984 | European Pat. Off. |
| 0105647 | 4/1984 | European Pat. Off. |
| 0106532 | 4/1984 | European Pat. Off. |
| 2803975 | 8/1978 | Fed. Rep. of Germany |
| 192633 | 11/1982 | Japan .................. 192/82 T |
| 712476 | 7/1954 | United Kingdom |
| 907936 | 10/1962 | United Kingdom |

Primary Examiner—Rodney H. Bonck
Assistant Examiner—David A. Testardi
Attorney, Agent, or Firm—Toren, McGeady & Associates

[57] ABSTRACT

A fluid friction clutch, suitable especially for a cooling fan of an internal combustion engine, has a shear gap of substantially serpentine form seen in axial longitudinal section, which is formed by concentric annular ribs. The ribs of the two parts which form the shear gap engage in each case in concentric annular grooves between radially adjacent ribs of the other part. The ribs have conical ring flanks with a flank angle preferably of 30° and terminate in a flat end face perpendicular to the rotation axis. The groove bottom opposite to this end face has a rounded cross section and is spaced from the end face by a distance about equal to 1.2 to 1.4 times the width of the shear gap between opposed rib flanks. Because of this geometry, the fluid friction clutch has a very great torque transmission capacity with small dimensions and reacts very rapidly to variations of state. The configuration of the ribs and channels guarantees an optimum conductance of heat and affords only a relatively slight flow resistance to the shear fluid.

5 Claims, 2 Drawing Figures

FLUID FRICTION CLUTCH

BACKGROUND OF THE INVENTION

The invention relates to a fluid friction clutch, especially a cooling fan for an internal combustion engine.

From German Publ. Spec. No. 2,803,975 a cooling fan for an internal combustion engine is known, the fluid friction clutch or viscous clutch of which comprises a housing carrying the fan blades and a runner or rotor arranged in a working chamber of the housing and driven by the internal combustion engine. The housing and the rotor are rotatable in relation to one another and form a shear gap by way of which, when it is filled with a viscous shear fluid, the torque is transmitted from the rotor to the housing and thus the fan blades. In the region of the external circumference of the rotor a pump device is provided which, in relative rotation of the rotor and the housing, delivers the shear fluid out of the working chamber into a reservoir, likewise formed by the housing. A temperature-controlled valve controls the return flow of the shear fluid from the reservoir back into the working chamber.

The shear gap of the known fluid friction clutch has a serpentine form, to increase the torque-transmitting areas, and is formed by circular ribs of the rotor and of the housing, which ribs are arranged coaxially one within the other. The ribs have cylindrical peripheral surfaces and extend each axially between the ribs of the other part. In this way the object is achieved that despite comparatively small dimensions a comparatively great torque can be transmitted. Admittedly in the torque transmission heat of friction occurs which, in the known fluid friction clutch, cannot in all operational situations be conducted away quickly enough, so that the shear fluid situated in the shear gaps is strongly heated. This leads to a distinct reduction of the maximum transmittable torque and to a thermal overloading of the shear fluid, considerably shortening its life.

Now the invention provides a fluid friction clutch which firstly, with comparatively small dimensions, can transmit a comparatively great torque, in such a manner that heat generated in the shear gap can be conducted away well. Despite these properties the fluid friction clutch is simple to produce.

SUMMARY OF THE INVENTION

The fluid friction clutch, suitable especially for a cooling fan of an internal combustion engine, comprises a housing rotatable about an axis of rotation and having a working chamber in which a rotor driven by the internal combustion engine is arranged rotatably in relation to the housing. The rotor is substantially of disc form and extends transversely of the rotation axis. The rotor and the housing each carry, lying oppositely to one another, several circular ribs arranged concentrically one within the other, which are separated from one another by circular concentric channels or grooves. The ribs of each one part engage in axially opposite grooves of the other part, so that mutually adjacent ring flanks of the ribs form a shear gap which has an approximately serpentine cross-sectional form in the radial direction. Both the ribs and the grooves have ring flanks extending conically towards one another in the axial direction. Thus the object is achieved that firstly the material cross-section of the ribs becomes wider towards the rib base and thus increases the heat-transmitting material cross-section. On the other hand the circulation of the shear fluid in the radial direction along the rotor and the housing is improved in comparison with the known fluid friction clutch as initially explained. Due to the conical formation of the grooves and ribs the flow resistance between the shear gap to the shear fluid is reduced. The flank angle of the ribs and grooves expediently lies between 20° and 40° and preferably amounts to about 30°. The generatrices of the ring flanks are here inclined preferably symmetrically in relation to the axial direction. The conical configuration of the ring flanks of the ribs and grooves also achieves the object that the temperature regulation system of the fluid friction clutch reacts very rapidly to variations of state.

In order to simplify production, each rib preferably terminates in a plane end face extending perpendicularly of the axis of rotation. The axial distance of the end face of each rib from the bottom of the associated axially opposite groove is here expediently made larger than the width of the shear gap between the mutually opposite flanks of the rib and the associated groove. The axial interval between the end face and the channel bottom preferably amounts to 1.2 to 1.4 times the width of the shear gap. These advantageous dimensions lead to a very high sensitivity of response of the fluid friction clutch to variations of temperature.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE DRAWINGS

Figure 1:
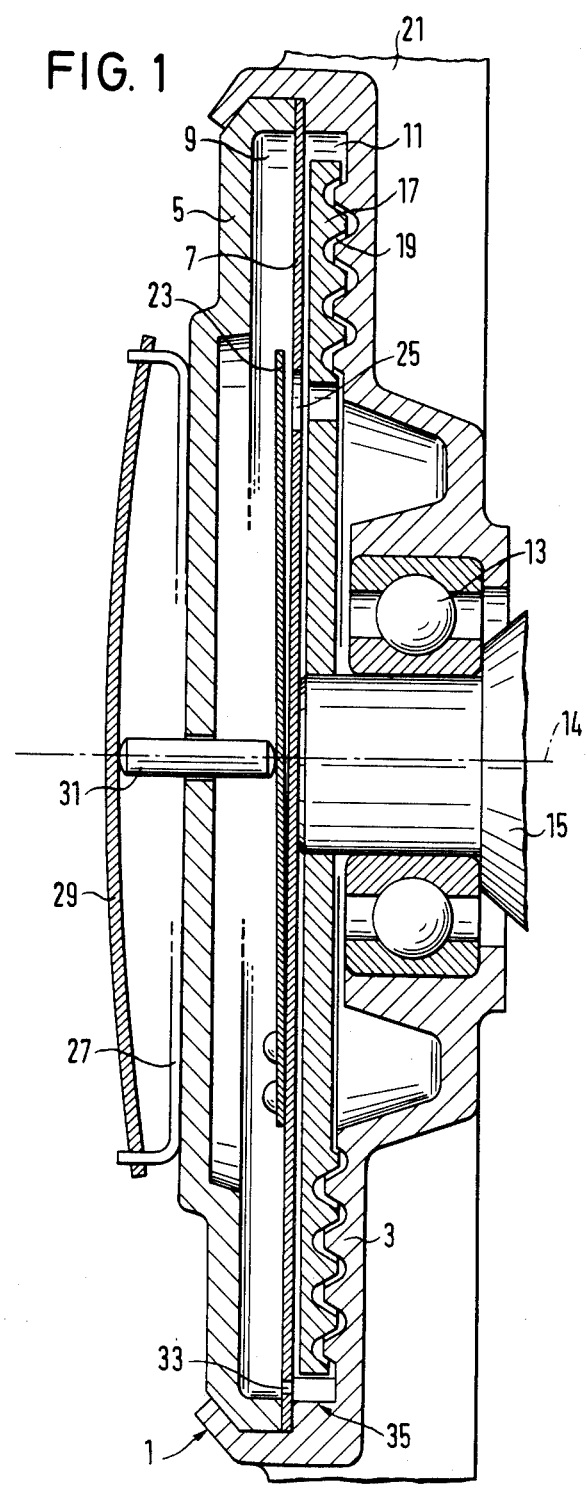
FIG. 1 shows an axial longitudinal section through a fluid friction clutch of a cooling fan of an internal combustion engine.

The fan clutch as represented in FIG. 1 comprises a housing 1 having a rear wall 3 and a front wall 5. A partition 7 divides the cavity formed by the housing 1 into a reservoir 9 for a viscous fluid and a working chamber 11. The housing 1 is mounted with its rear wall 3 rotatably about a rotation axis 14 through an anti-friction bearing 13 on a drive shaft 15 driven by the internal combustion engine, which is not further illustrated. The drive shaft 15 carries in the working chamber 11 a rotor 17 of substantially disc form extending transversely of the axis 14 of rotation. The rotor 17 forms, with the rear wall 3 lying opposite to it, a shear gap 19, to be explained in greater detail below, which has a substantially serpentine cross-sectional form radially of the rotation axis 14. When the shear gap 19 is filled with shear or viscous fluid from the reservoir 9, the drive torque of the drive shaft 15 is transmitted to the fan blades 21, which are for example integrally connected with the housing rear wall 3.

The fan clutch is engaged and disengaged in dependence upon temperature. For this purpose in the partition 7 there is provided a valve opening 25 controllable by a valve lever 23, approximately in the region of the radially inner end of the shear gap 19, through which opening, when it is in the opened condition, viscous fluid can enter the working chamber 11 from the reservoir 9. The valve lever 23 is controlled by a bimetallic element 29, held in a holder 27 on the outside of the housing front wall 5, through a central pin 31 axially displaceably guided in sealed manner in the front wall 5. The return of viscous fluid from the working chamber 11 into the reservoir 9 is ensured by an opening 33 arranged in the region of the external circumference of the partition 7, which opening co-operates in the usual way with a pump device 35 which is effective on relative rotation of the rotor 17 and the housing 1.

In the cold condition the bimetallic element 29 closes the valve opening 25, by means of the valve lever 23, and the pump device 35 pumps the viscous fluid contained in the working chamber 11 and the shear gap 19 into the reservoir 9. Thus the cooling fan is set out of action. In the operationally hot condition the bimetallic element 29 opens the valve opening 25, whereby the viscous fluid can enter the working chamber 11 and fill the shear gap 19 for the torque transmission, despite the pumping action of the pump device 35. Thus the fan clutch is engaged.

Figure 2:
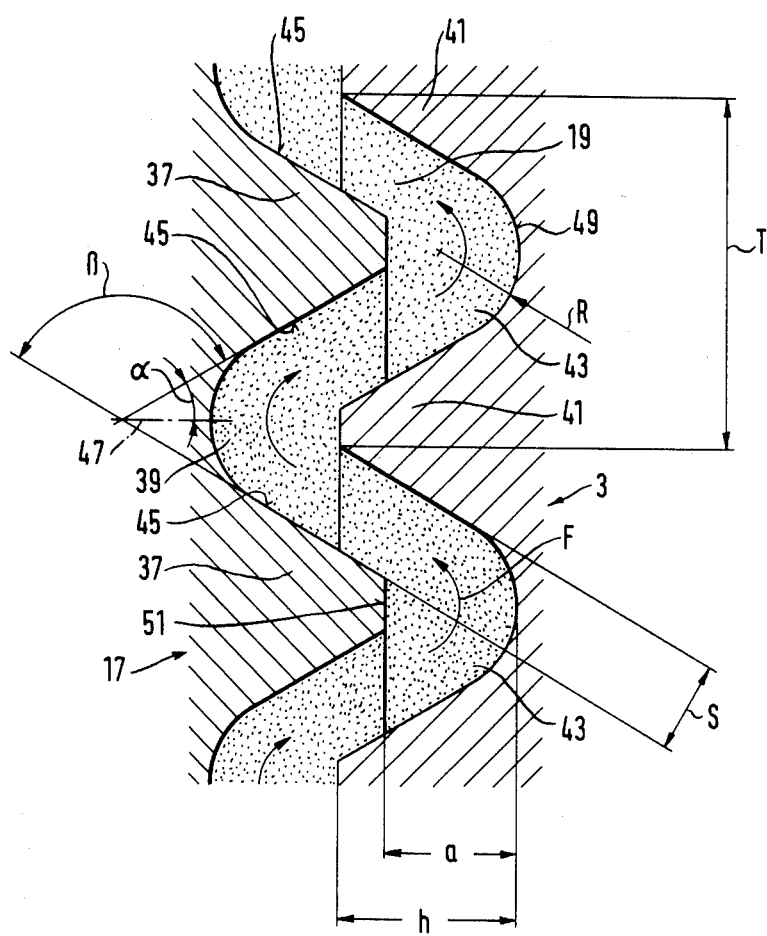
FIG. 2 shows an enlarged representation of the shear gap of the clutch according to FIG. 1.

FIG. 2 shows details of the shear gap 19. The rotor 17 is provided on its side adjacent to the rear wall 3 with ribs 37 of circular form arranged concentrically one within another, which form circular channels or grooves 39 between them. In the same manner the rear wall 3 is likewise provided on its side lying opposite to the rotor 17 with circular ribs 41 lying concentrically one within another which are separated from one another by circular channels or grooves 43. The radial interval T of the ribs 41 is equal from rib to rib and also equal to the radial interval of the ribs 37. The ribs 37 and 41 engage each in axially opposite channels 43 and 39, with the ribs 37 and 41 overlapping one another in the axial direction and forming the shear gap 19 of width S.

The ribs 37 and correspondingly also the ribs 41 have annular flanks 45 converging conically towards one another, the generatrices of which each have the same flank angle in relation to the axially parallel line entered at 47.

The bottom 49 of each groove 39 and 43 has a circular or rounded form, seen in axial longitudinal section, the circle radius R being made approximately equal to the width S of the shear gap 19. The ends of the ribs 37 and 41 lying each axially opposite to the groove bottom 49 are flattened off into plane annular end faces 51 extending perpendicularly of the axis of rotation, so that the axial distance a of each end face 51 from the axially opposite groove bottom 49 is approximately equal to 1.2 to 1.4 times the width S of the shear gap 19. Thus seen in axial longitudinal section through the rotor 17 and the housing rear wall 3 respectively, the ribs 37, 41 have the form of a trapezoid with height h, which merges into a concavely rounded foot region.

The proposed form of the rotor 17 and of the housing 1 can be produced easily and, especially by reason of the end faces 51, avoids sharp-edged external contours which could lead to injuries during the production and assembly of the clutch. Furthermore with the selected flank angle $\alpha 0$ of about 30° a very good heat removal results in the ribs 37, 41, so that the temperature rise in the viscous fluid during the torque transmission remains limited to a minimum. The selected flank angle $\alpha$ leads to a comparatively small deflection angle $\beta$ of 120° whereby the flow conditions of the viscous fluid in the shear gap 19 are improved. By reason of the comparatively slight deflection the viscous fluid can flow, with low flow resistance, in the direction of the arrow F from the radially inner regions of the shear gap 19 to its radially outer regions. The reduction of the flow resistance shortens the response time of the clutch in changes of state of engagement or disengagement.

The fluid friction clutch a explained above comprises only one shear gap of serpentine form between the rotor 17 and the rear wall 3. It is understood that alternatively the shear gap can be provided also between the rotor 17 and the partition 7, possibly even on both sides of the rotor 17.

While specific embodiments of the invention have been shown and described in detail to illustrate the application of the inventive principles, it will be understood that the invention may be embodied otherwise without departing from such principles.

We claim:

1. A fluid friction clutch, such as for a cooling fan of an internal combustion engine, comprising:
   (a) a housing rotatable about an axis of rotation and enclosing a reservoir for shear fluid and a working chamber,
   (b) a rotor arranged in the working chamber rotatably about the axis of rotation in relation to the housing,
   (c) at least one shear gap formed by facing surfaces of the rotor and of the housing spaced from one another, each of the surfaces forming the shear gap comprises a plurality of annular ribs arranged concentrically one within another around the axis of rotation, said ribs are separated from one another by circular concentric grooves and extend in the axis of rotation direction into the grooves of the other surface, wherein both the ribs and the grooves have annular flanks extending in the axis of rotation direction conically towards one another,
   (d) pump means in the radially outer region of the shear gap, for delivering the shear fluid from the working chamber to the reservoir,
   (e) temperature-dependently controllable valve means conducting the shear fluid from the reservoir into the working chamber,
   (f) the ribs and the grooves have a flank angle in a range of 20° to 40° with respect to the axis of rotation,
   (g) the grooves have a concave groove bottom curved in arcuate form, and
   (h) the ribs have trapezoid-shaped cross section, viewed in the axis of rotation direction, the ribs have a flat annular end face extending in a plane perpendicular to the rotation axis, and said end faces on said surfaces are located opposite and spaced from the groove bottoms on the opposite said surfaces.

2. A fluid friction clutch according to claim 1, wherein the flank angle amounts to about 30°.

3. A fluid friction clutch according to claim 1, wherein the groove bottom has a radius of curvature which is aproximately equal to the width of the shear gap between mutually opposite flanks.

4. A fluid friction clutch according to claim 1, wherein the axial distance of the end face of the rib from the bottom of the opposie groove is greater than the width of the shear gap between the mutually opposite flanks of the rib and the associated groove.

5. A fluid friction clutch according to claim 4, wherein the distance in the axis of rotation direction between the opposed end faces and the groove bottoms is in the range of 1.2 to 1.4 times the width of the shear gap.

* * * * *